(12) United States Patent
Cunningham

(10) Patent No.: US 7,298,063 B2
(45) Date of Patent: Nov. 20, 2007

(54) QUANTUM DISK ARMATURE ELECTRIC GENERATOR

(76) Inventor: Sydney A. Cunningham, 1368 New York Ave., Brooklyn, NY (US) 11203

( * ) Notice: Subject to any disclaimer, the term of this patent is extended or adjusted under 35 U.S.C. 154(b) by 345 days.

(21) Appl. No.: 10/281,039

(22) Filed: Oct. 28, 2002

(65) Prior Publication Data

US 2004/0080238 A1    Apr. 29, 2004

(51) Int. Cl.
*H02K 7/20* (2006.01)
(52) U.S. Cl. ...................... 310/112; 310/268
(58) Field of Classification Search ............. 310/112, 310/113, 114, 89, 268
See application file for complete search history.

(56) References Cited

U.S. PATENT DOCUMENTS

| | | | | |
|---|---|---|---|---|
| 3,431,638 A | * | 3/1969 | Burr | 29/598 |
| 5,184,040 A | * | 2/1993 | Lim | 310/114 |
| 6,130,493 A | * | 10/2000 | Nitschke et al. | 310/89 |

\* cited by examiner

*Primary Examiner*—Darren Schuberg
*Assistant Examiner*—Nguyen N. Hanh

(57) ABSTRACT

Plurality of discs shaped permanent magnet polefaces are disposed on a armature shaft, plurality of discs shape armatures are also disposed on said armature shaft. Each armature is situated between two polefaces with endframes supporting each end of said shaft, elongated support strut are fixedly attached between both endframes and also secured each poleface. The shaft and its armatures rotate on bearing in each endframe.

11 Claims, 6 Drawing Sheets

QUANTUM DISK ARMATURE ELECTRIC GENERATOR

BACKGROUND OF THE INVENTION

1. Field of Invention

This invention relate to an apparatus for the generating of electricity. But more specifically, the invention relate to discs shape poleface made from permanent magnet, reacting with discs shape armature or multiple armatures. Where a armature may be placed between two polefaces and disposed on a armature shaft and rotate to produce electricity, the number of armature and poleface may be increase as required.

2. Description of the Prior Art

The prior art electric generator, a device which resist rotation; this resistance cause losses which reduce efficiency. This device generally incorporate a single cylindrical rotor per unit which is not cost effective, and is therefore inadequate; for the generating of electricity with respect to the growing energy consumption in general.

Accordingly, the desire and need exists to develop a new form of generator on a format which will produce large amount of electricity at a low cost. My present innovation was designed to fulfill that need as its objective.

SUMMARY OF THE INVENTION

This innovation present a new format on which to build electric generator for the present and distance future. This device incorporate plurality of permanent magnet discs used as polefaces are disposed on a armature shaft. Plurality of discs with windings form the armature which are also disposed on said armature shaft, with each armature situated between two permanent magnet polefaces. The armatures are attach to the shaft, said shaft is supported at each end by endframe and rotate there-between. elongated support struts are placed between both endframes and fixedly attach thereto, said struts are part of the framework which support the endframes and also each poleface in the unit attach thereto. The wiring from the armature is taken along a duct cut in the length of the shaft, to a commutator and brush assembly at the output end of said shaft. When a torque is applied to the input shaft, said shaft and all its connected armatures rotate between each set of poleface; current is generated in each armature and is also available at the output.

Unlike the prior art device with its single armature, it is the object of this invention to produce an electric generator having any required number of armature rotating on a single shaft as a unit.

Another object of this invention is to provide an electric generator, so configured to supply electricity to all form of electric powered transportation.

Still another object of this invention is to provide an electric generator which can be constructed to meet the need of Residential, Commercial, and Industrial consumer.

Preferably, the endframes and polefaces are substantially the same size. Preferably, the endframes and polefaces are substantially circular and situated substantially in the same plane. Preferably, the support struts are substantially curve to the contour of both the endframes and polefaces.

Preferably, the duct section of the armature shaft is substantially square.

BRIEF-DESCRIPTION OF THE DRAWINGS

DESCRIPTION OF THE PREFERRED EMBODIMENT

Figure 6:
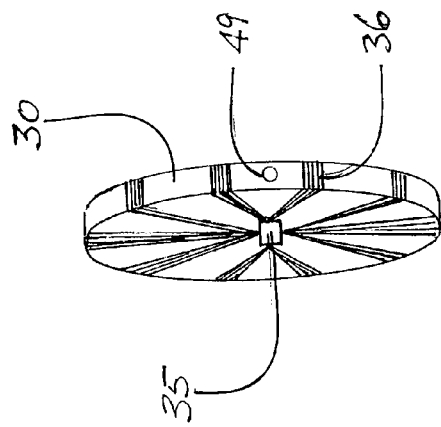
FIG. 6 is a isometric view of the disk type armature with windings and opening from which armature shaft is attach.
Figure 9:
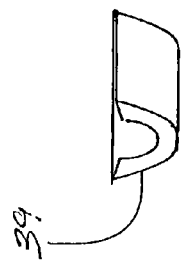
FIG. 9 is a isometric view of the poleface sleeve.

The quantum disk armature is part of a new type of electric generator, while its configuration is different in many ways to that of the prior art, its operating principle remain the same. The way in which energy is been used will be profoundly change by the new and simple device shown in the embodiment of FIG. 1. This is an isometric view of an electric generator having four disk type armatures 30 with armature windings 36, a opening 35 is provided in the center of each said armature to receive the armature shaft, said opening 35 is shown at FIG. 6 and the center is taken as half the diameter.

Figure 5:
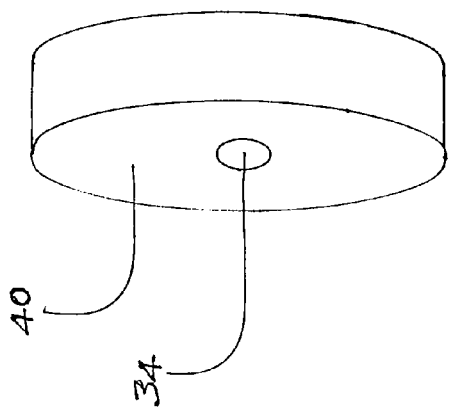
FIG. 5 is a isometric view of a magnetic poleface with opening throughout which the armature shaft intersect.

Each magnetic poleface 40 is also of disk form and have opening 34 cut in the center, said holes are large enough from which armature shaft intersect and rotate therethrough without touching said poleface. The center of each poleface is taken as half the diameter, and each said opening is shown at FIG. 5.

Figure 10:
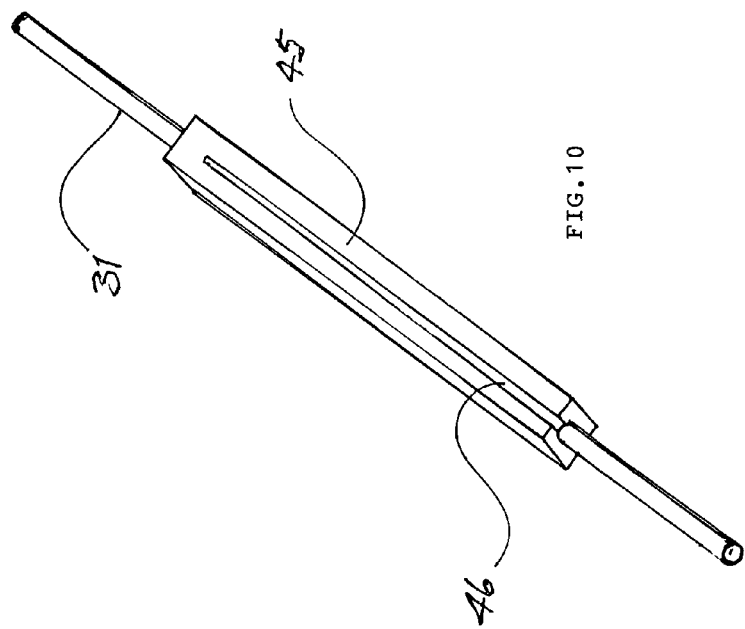
FIG. 10 is a isometric view showing the armature shaft having two different section and also a duct.

Two endframes 43 and 44 are located one at each end of the generator and have opening 47 and 48 cut in the center of each said endframe where bearings 41 and 42 are fitted. Each endframe 43 and 44 are substantially the same size as poleface 40, and the centerpoint of said endframes are obtained by using half the length of its diameter. The armature shaft 31 is shown at FIG. 10 with a square section 45 which carry armature 30, Each armature 30 is fitted to the shaft 31 and fix in place one poleface 40 is place on each side of armature 30 on the said shaft.

Figure 1:
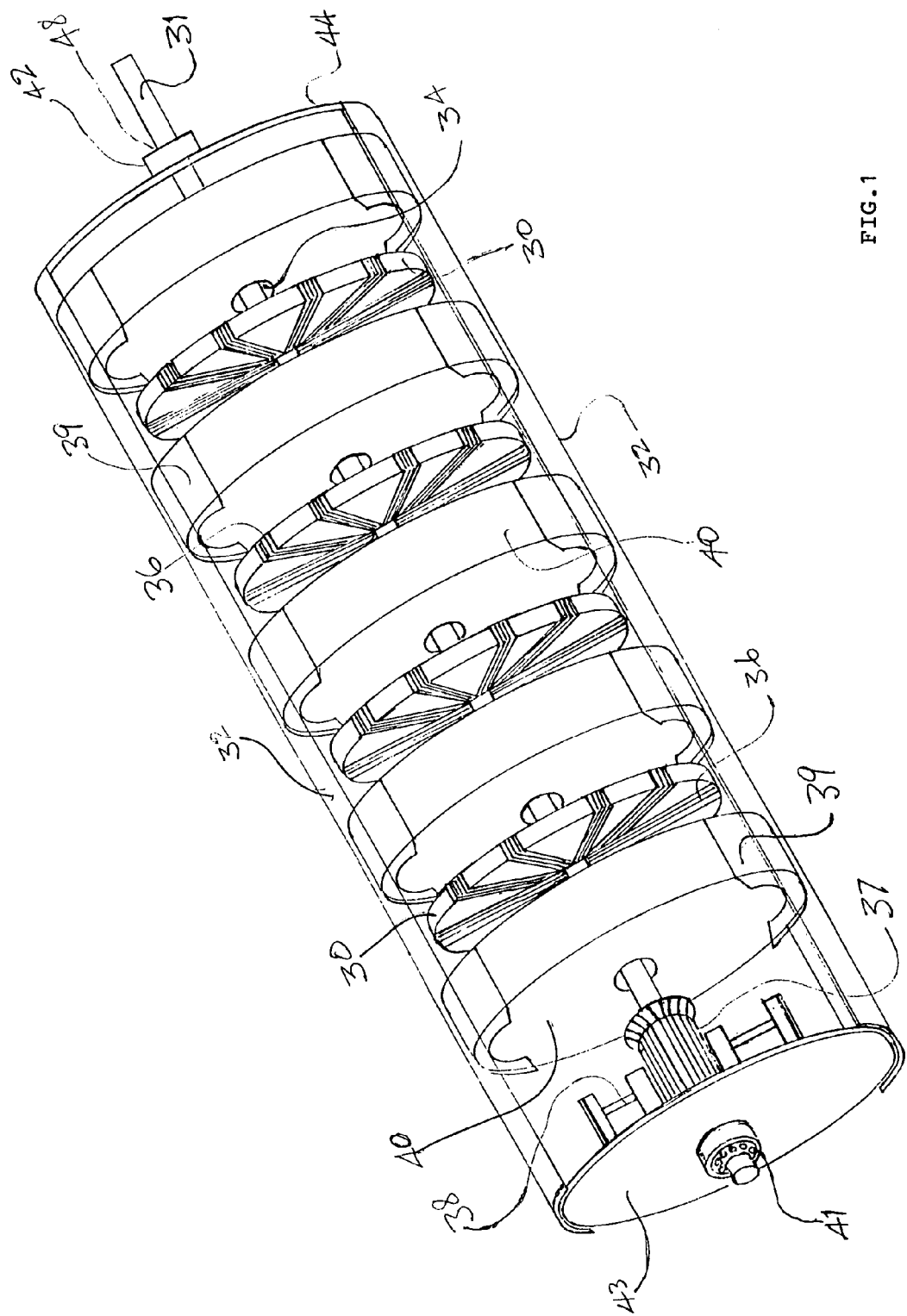
FIG. 1 is an isometric view showing the preferred embodiment of the disk armature electric generator with four armatures of the present invention.
Figure 2:
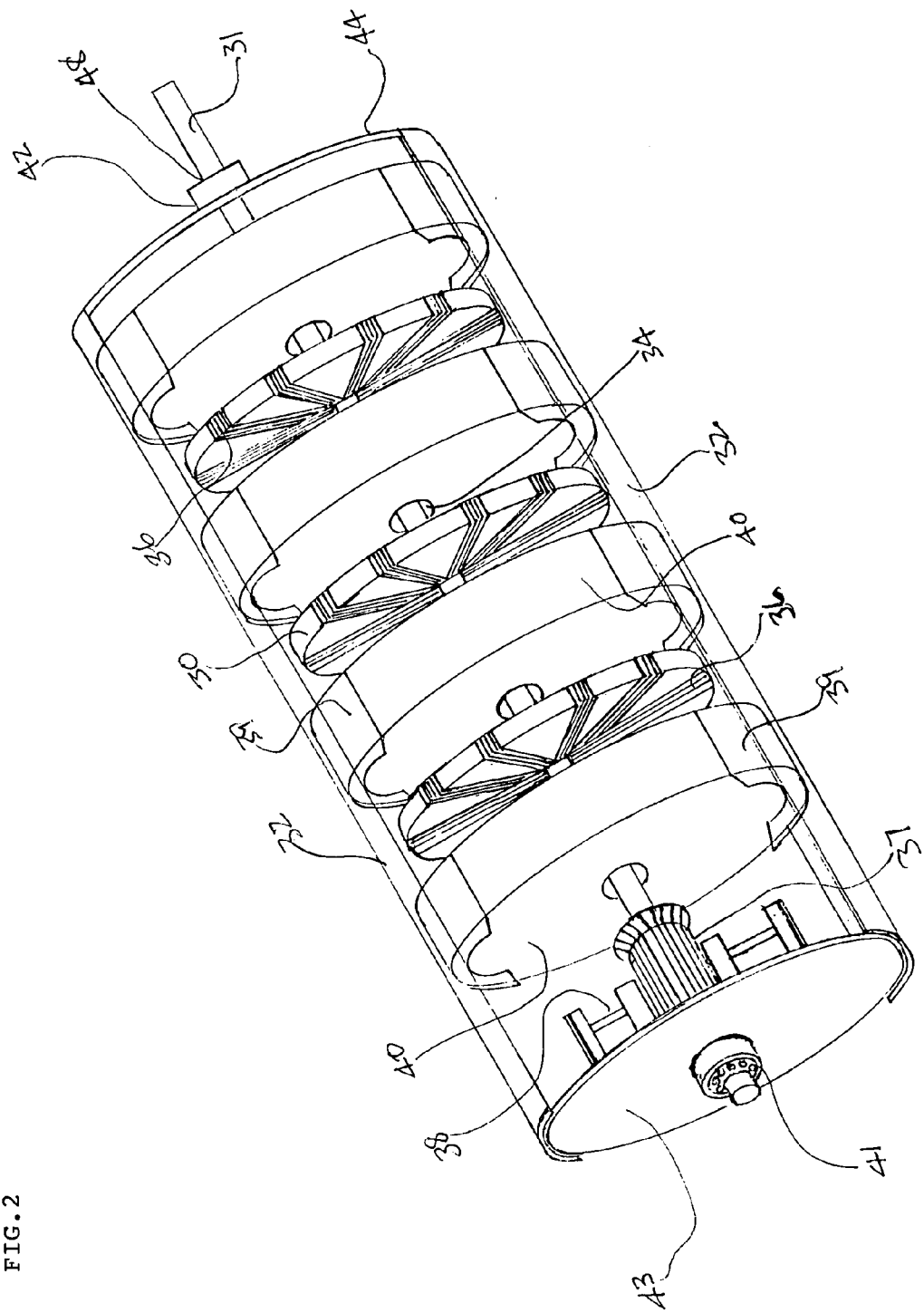
FIG. 2 is a said isometric view of FIG. 1 but with three armatures.
Figure 3:
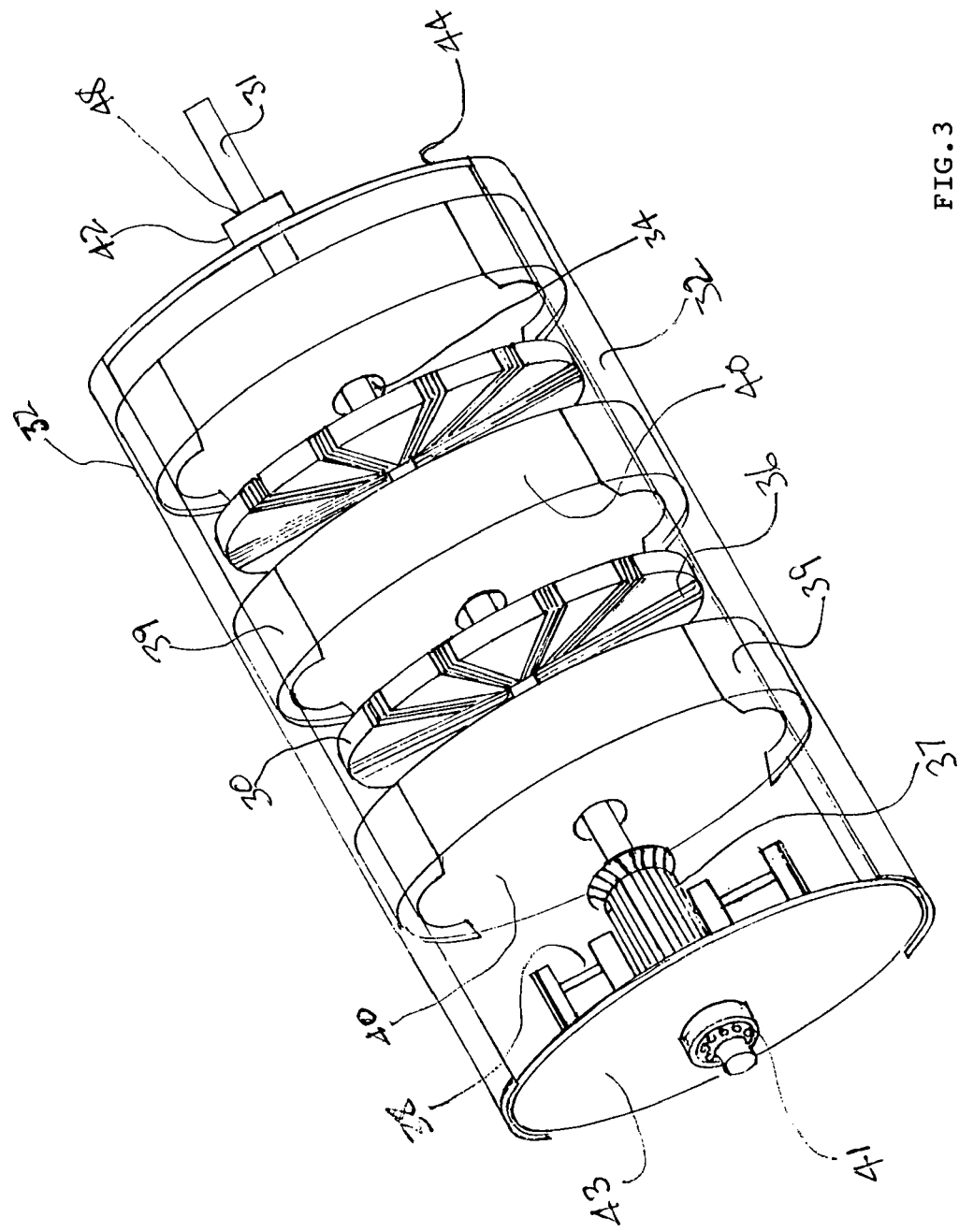
FIG. 3 is a said isometric view of FIG. 1 but with two armatures.
Figure 4:
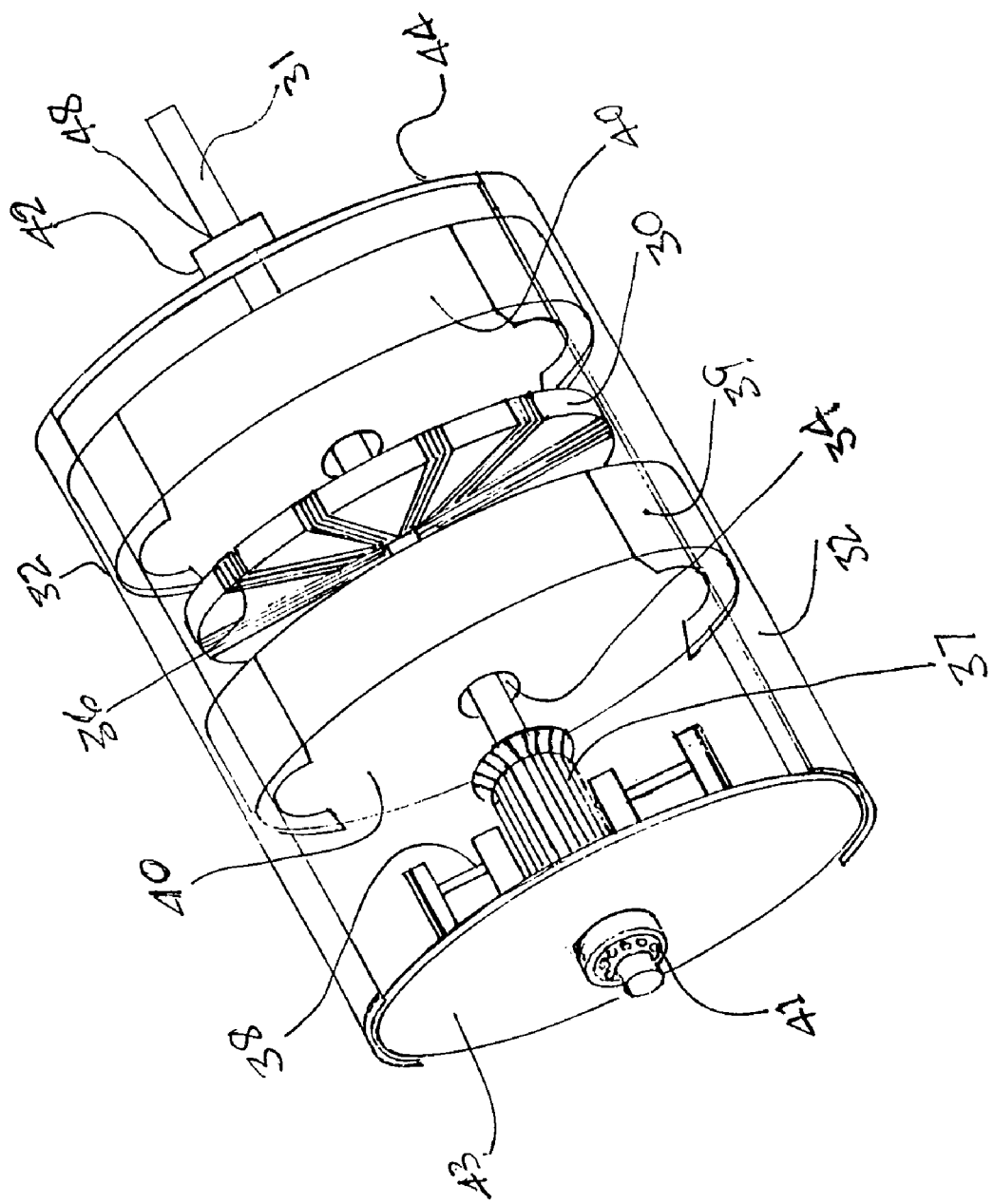
FIG. 4 is a said isometric view of FIG. 1 but with one armature.

Duct 46 is provided along said armature shaft which carry wiring from each armature 30 to the commutator 37 shown at FIG. 1. Said commutator 37 is attach to the end of shaft 31 where duct 46 exit, sleeves 39 are made to fit the contour of poleface 40 and serve to secure sleeve 39 to same.

Figure 8:
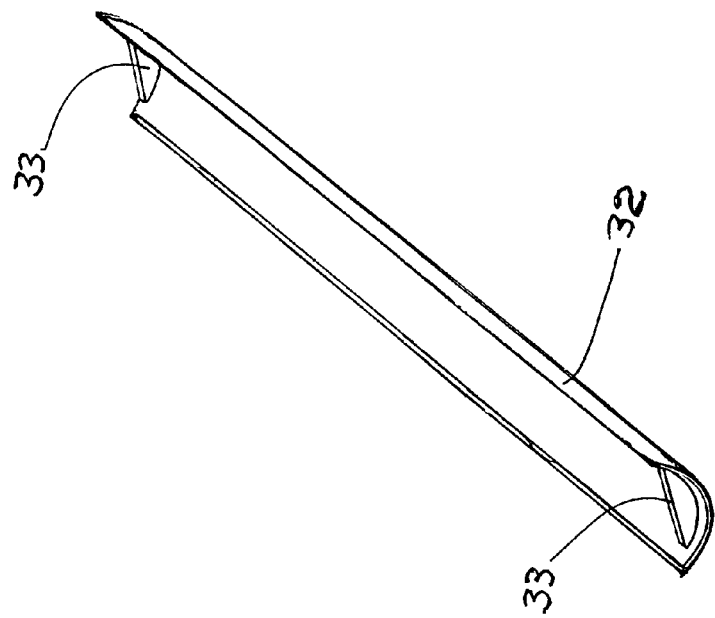
FIG. 8 is a isometric view of the elongated support strut with brace attach to each end.
Figure 7:
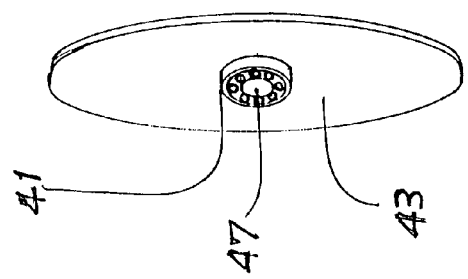
FIG. 7 is a isometric view showing one of two endframes with opening for armature shaft.

Elongated support strut 32 is fashioned to the contour of endframes 43,44, and also to sleeve 39, the support strut 32 is shown at FIG. 8; the concave curve along its length give additional strength to the strut. Attach to the end of said struts are braces 33 which provide support and anchoring for each endframe, and help to strengthen strut 32. FIG. 1 show brush assembly 38 around commutator 37 and attach to the inside of endframe 43, wiring from each armature 30 to commutator 37 via duct 46 is not shown.

To produce and assemble such a device is very simple for anyone verse in the art of electric generator and motors.

With all parts for assemble the armature shaft 31 is position with commutator 37 attach to that end from which the duct 46 exit, each poleface 40 and armature 30 are placed on said shaft 31 in such a way that there is always one armature 30 between two polefaces 40. Said polefaces are of permanent magnet with the sleeves 39 already attach to poleface 40 each endframe 43 and 44 is place on armature shaft 31 through bearings 41 and 42, with brush assembly 38 in position around commutator 37, and said shaft extend beyond the second endframe 44. wiring from armature windings 36 is taken to commutator 37 via duct 46 and connected thereto, each support strut 32 is fixedly attach to each endframe 43 and 44 mainley with brace 33 which defined the perimeter of the device. Armature and polefaces are fixed at designated position, which maintain the air-gap required by electric generator and motors. Each poleface 40, is situated between supporting struts 32 and means for fixedly mounting said polefaces between said supporting struts, and armature shaft 31 rotate through said opening 34 in poleface 40. The length of the device is determine by the number of armatures used, an increase in said armature require an increase in the number of polefaces, the length of armature shaft, and supporting strut.

Assembling is now finish and a torque is applied which rotate shaft 31 and the armatures attach to it, this rotating armature windings cut the magnetic field set up between the polefaces, and in so doing generate current into the armature windings; this current is available at the output of the generator.

Consideration and appreciation to the present invention relating to a disk type armature electric generator, wherein any required number of disk armature can be design to rotate on a single armature shaft which will vastly increases the output current generated, while reducing the size, weight, and input energy requirement; compare to the prior art generatots.

Any required number of armature can be utilize without significant modification to the overall design of the device, these are a few of the many advantage that accompany this new application.

There are a limited number of preferred embodiments been disclosed for the purpose of illustration, modification dimensional variations can be readily envisioned to achieve an equivalent result, it is therefore intended to cover all of these variations and modifications which fall within the scope of this invention; and define by the appended claims.

I claim:

1. A disk shape armature electric generator, comprising: a armature shaft with duct along said shaft which carry armature wiring, associated with said armature shaft are two or more disks shape magnetic polefaces and one or more disk shape armature winding, each said poleface and armature winding having center aperture from which said shaft intersect and rotate therethrough; polefaces and armature are disposed on said armature shaft in a configuration which position said armature between two polefaces, sleeve means are fastened to the poleface contour and envelops part of said poleface, sleeves attachment secured each poleface in a space apart position which maintain the required airgap between poleface and armature winding; elongated supporting struts also designed to the poleface contour and work in conjunction with each sleeve to support polefaces by fixedly attach said struts to each poleface which also define the perimeter of the device.

2. The generator of claim 1 wherein said armature shaft rotate through center aperture in each poleface without touching said poleface.

3. The generator of claim 2 wherein any required number of two or more disk shaped armature windings may be disposed on a single armature shaft and rotate between polefaces as a single unit.

4. The generator of claim 1 wherein brace is attached to each end of each supporting strut.

5. The generator of claim 1 wherein any required number of two or more disk shape poleface may be disposed on a single shaft to work with the required number of armature.

6. The generator of claim 1 wherein the disk shaped armature, the path taken by each winding is from the center of said armature to any point along its circumference.

7. The generator of claim 2 wherein the section of armature shaft carrying the armature is square.

8. The generator of claim 1 comprising one armature winding.

9. The generator of claim 1 comprising two armature windings.

10. The of claim 1 comprising three armature windings.

11. The generator of claim 1 comprising four armature windings.

* * * * *